Figure 1:
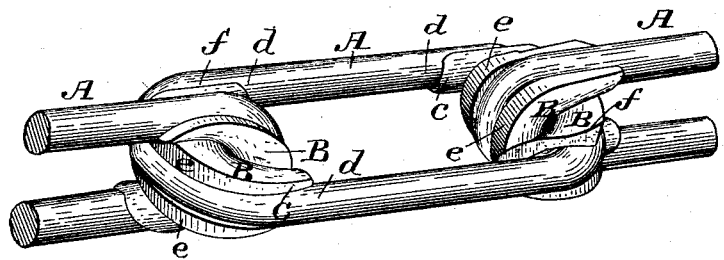

(No Model.)

W. D. EWART.
CHAIN.

No. 374,148. Patented Nov. 29, 1887.

ATTEST.
J. Henry Kaiser
Alfred E. Sneden

INVENTOR.
William D. Ewart
By J. N. McIntire
his Atty.

UNITED STATES PATENT OFFICE.

WILLIAM D. EWART, OF CHICAGO, ILLINOIS.

CHAIN.

SPECIFICATION forming part of Letters Patent No. 374,148, dated November 29, 1887.

Application filed August 23, 1887. Serial No. 247,667. (No model.)

*To all whom it may concern:*

Be it known that I, WILLIAM D. EWART, of Chicago, in the county of Cook and State of Illinois, have invented a new and useful Improvement in Chains; and I do hereby declare that the following is a full, clear, and exact description thereof, reference being had to the accompanying drawings, making part of this application.

Previous to my invention it has been customary to form the links of that species of chain known as "cable chain" with an enlargement of the stock at each end of each link, so that in the use of the chain there should be a greater thickness of metal at the semicircular or semi-elliptical end of each link, where the frictional wear comes, than at any other part of the link; but, though this form or construction of link is better than the old-fashioned cable-chain structure, in which each link had the same thickness of stock throughout its contour, still it is defective in that even the enlarged bearing and wearing end portions of the link will of course get worn out, and the weakening of these portions of the links renders the entire chain useless.

It has also been common prior to my invention to make cable chain with cast-metal removable, and hence renewable, bearer-blocks or saddle-like wearing-pieces interposed between the enchained ends of the links in a manner well known, and so that when said wearing-blocks should become badly worn they might be renewed, and thus the chain rendered more enduring than either the old-fashioned chain or the more modern structure last above described; but in the form of chain comprising the removable bearer-blocks there is more or less wear to the end portions of the links, because they move in contact with the saddle-like bearing-surfaces of the blocks, and this wear of the link ends will sooner or later weaken these portions of the chain, so that the latter will become useless.

I propose by my improvement to provide for use a chain of the cable species in which, while the articulations shall be as free as in any of the forms of such species of chain heretofore made, the stock of the links themselves shall not be subjected to any frictional wear whatever, (at the articulations of the chain,) all the wear and tear coming upon the removable thimble-like castings, which are combined with the end portions of the links in such manner as to receive all the frictional wear arising at the joints of the chain, and which are easily removable for the purpose of substituting new castings whenever those in use may become seriously worn.

My invention is more especially adapted to that kind of cable chain in which comparatively large centrally-open links are used and that is designed to be used in connection with sprocket or chain wheels, the teeth of which engage with the central openings of certain ones of the links of the chain in a well-known manner; and my invention may be said to consist in the combination, with the end portions of the centrally-open links of a cable chain, of removable, and hence renewable, bearer-blocks or thimble-like castings which during the working or use of the chain move always with the links to which they are fitted, and which bear against each other in pairs and receive all the frictional wear arising at the joints of the chain, all as will be hereinafter more fully explained, and as will be more specifically pointed out in the claim of this specification.

To enable those skilled in the art to which my invention relates to fully understand and practice the same, I will now proceed to more fully describe my novel construction of chain, referring by letters to the accompanying drawings, which form part of this specification, and in which I have shown my invention carried out in that form in which I have so far successfully practiced it, and which is about the best form now known to me, though my said improvement may of course be carried into practical effect under various modifications, and possibly in a form better than that herein shown and described.

Figure 2:
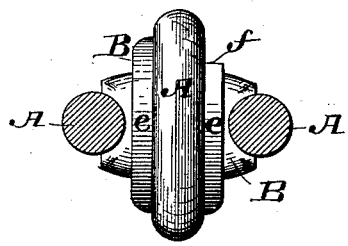
Figure 3:
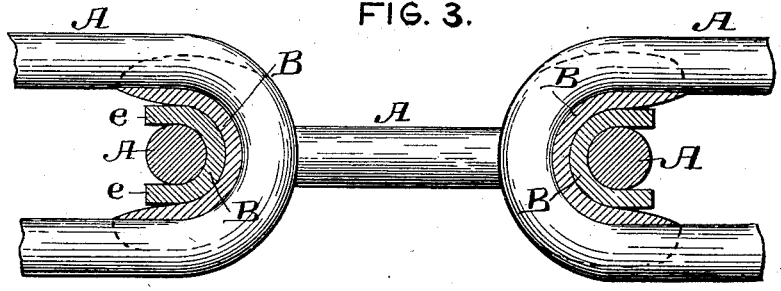

In the drawings, Figure 1 is an isometrical perspective view of a piece of chain made according to my invention. Fig. 2 is a vertical central section of the same. Fig. 3 is a vertical cross-section at the line *x x* of Fig. 2.

In the several figures the same part will be found designated by the same letter of reference.

A are the links, which in the case shown have semicircular ends and straight side bars and are composed of round iron.

B are the removable bearer-blocks, which in the case shown (the links of the chain being exact duplicates) are all exactly alike. Each one of the cast-metal blocks or thimble-like devices B is made, preferably, of a form such as to present in side view a sort of crescent shape, the end portions, c, extending onto the straight side-bar portions d of the link A, as shown. The said casting B in the case shown has surfaces e e, that are flat in a cross-sectional view of the casting (see Fig. 2) and curved in side view, with a curvature such as to nearly or quite conform for some distance with the circular curvature of the end of the link A with which the casting is combined, and such as to run thence off (at either end of said crescent-shaped casting) into nearly straight lines nearly or quite parallel with the side-bar portions of said link. (See Figs. 1 and 2.) The said casting is also made with a seat-like curved depression, within which fits the internal portion of the semicircular end of the link A in such manner, as shown, that when the parts A and B of the chain are assembled they will practically operate in the working of the chain the same as if they were integral.

In practice it will be best to have the curved ends of the links A seated so snugly or tightly within the recessed portions of the thimble-like castings B (preferably by slightly driving the castings home to their places in putting the parts of the chain together) as to prevent casual misplacement of the parts when the chain may not be under draft-strain or may be wholly out of a working position or condition.

To permit the assembling of the parts of the chain and to render the castings B easily removable and renewable, one of the end portions, c, of each casting B has a depressed part, f, at one side, so that whenever the part B shall have been moved out of engagement with the seated portion of A and sufficiently toward the middle of the link (lengthwise of the latter) the depressed end part, f, of the casting B will easily pass by the inner surface of one of the side bars, d, of the link, thus permitting the easy separation of the part B from the part A of the chain.

Of course the precise forms of link A and cast bearing-blocks B shown need not necessarily be followed in practicing my invention, the gist of which lies in the use of combined links and castings which in the operative use of the chain bear and work against each other and move bodily with the links with which they are assembled, as shown and described. The broad surfaces e answer admirably as working and wearing surfaces against the working-faces of the sprockets of a chain-wheel in using the chain in connection with such wheels for the transmission of power and motion; but this structural feature of the chain I have shown, though a desirable one under some circumstances, is not, it will be understood, an indispensable part or feature of my invention. Whether the devices B be formed with these broad bearing-surfaces or not, they should be of such thickness in a chain having links with a given-sized central opening and a certain thickness of stock as to permit the formation of the blocks B, so that the portions of a pair of them that work together and form the articulate joint between the adjacent ends of a pair of links will be large enough to about occupy all of the semicircular end portions of the central openings of said links, as shown, in order that the most extensive working-surfaces practicable may be obtained for the chain joint to render it as enduring as possible.

In a chain made according to the novel plan of construction herein set forth the links will be subjected only to the draft-strain necessary to the working of the chain. All the wear and tear will come on the castings B, which are not only rendered competent (by the shape preferably given to them) to stand a large amount of usage, but which may be easily removed when worn out and replaced by new castings.

As the draft-strain under ordinary circumstances will hardly ever destroy the usefulness of the links, it follows that a chain like mine must be almost imperishable, with the exception of the parts B, which are renewable at comparatively little expense.

What I claim as new, and desire to secure by Letters Patent, is—

A chain composed of links A, arranged alternately in transverse planes, and separate pieces or thimble-like devices B, which, during the working of the chain, move bodily with the links with which they are assembled and which serve to take all the frictional wear at the chain-joints, all substantially as hereinbefore set forth.

In witness whereof I have hereunto set my hand this 1st day of June, 1887.

WILLIAM D. EWART.

In presence of—
WM. H. MYER,
HERMAN N. HAUSEN.